United States Patent [19]
Wu et al.

[11] Patent Number: 6,035,540
[45] Date of Patent: Mar. 14, 2000

[54] AUTOMATIC OPTICAL LEVELLING, PLUMBING, AND VERTICALITY-DETERMINING APPARATUS

[76] Inventors: Chyi-Yiing Wu; Lin Chin Hsiung, both of P.O. Box 55-846, Taipei, Taiwan

[21] Appl. No.: 09/024,340

[22] Filed: Feb. 17, 1998

[30] Foreign Application Priority Data

Jul. 10, 1997 [TW] Taiwan ................................. 86211419

[51] Int. Cl.[7] ............................. G01C 15/02; G01C 15/14
[52] U.S. Cl. ................................. 33/286; 33/281; 33/283; 356/138
[58] Field of Search .............................. 33/276, 281, 282, 33/283, 285, 290, 291, DIG. 21, 344, 397, 286; 356/149, 139.1, 4.08, 359, 138; 439/20, 21, 22, 27

[56] References Cited

U.S. PATENT DOCUMENTS

| | | | |
|---|---|---|---|
| 3,505,739 | 4/1970 | Abrams | 33/227 |
| 3,953,095 | 4/1976 | Iino et al. | 439/21 |
| 4,183,667 | 1/1980 | Denton | 356/250 |
| 4,982,938 | 1/1991 | Brenner | 267/140.12 |
| 5,173,053 | 12/1992 | Swanson et al. | 439/27 |
| 5,212,889 | 5/1993 | Lysen | 33/286 |
| 5,539,990 | 7/1996 | Le | 33/283 |
| 5,621,975 | 4/1997 | Rando | 33/227 |
| 5,680,208 | 10/1997 | Butler et al. | 356/250 |
| 5,704,792 | 1/1998 | Sobbani | 439/21 |
| 5,852,493 | 12/1998 | Monnin | 356/141.1 |

*Primary Examiner*—Andrew H. Hirshfeld
*Assistant Examiner*—Richard A. Smith

[57] ABSTRACT

An automatic optical levelling, plumbing and verticality-determining appartus includes: a base, a supporting and driving means adjustably standing on the base for supporting a frame having a plumb device secured to a horizontality calibrator universally pendulously mounted on the frame, a pair of plumb-line illuminators respectively secured on a top and a bottom portion of the plumb device for emitting an upper and a lower optical beam towards a ceiling and a ground floor for calibrating a vertical plumb line, a horizontal-line illuminator and a vertical-line illuminator symmetrically disposed on opposite ends of a T-shaped adapter mounted on a top of the plumb device and the horizontality calibrator for respectively emitting a horizontal optical line and a vertical optical line for determining or calibrating a horizontal plane and a vertical plane.

9 Claims, 9 Drawing Sheets

AUTOMATIC OPTICAL LEVELLING, PLUMBING, AND VERTICALITY-DETERMINING APPARATUS

BACKGROUND OF THE INVENTION

U.S. Pat. No. 4,993,161 (hereinafter called "prior art") disclosed a laser beam level instrument including a laser diode mounted on a pendulous platform suspended from a frame by gold plated Mylar strips which also serve as conductors for supplying power to the diode. The strips are mounted with a 180 degree twist to overcome resistance to Flexing/bending so that the platform moves freely under the influence of gravity to provide automatic self-leveling.

However, the prior art has the following drawbacks:

1. Only A.C. (alternative current) is available for powering the laser diode. If D.C. is applied across each strip (26) the magnetic field around the strips will be affected by the geomagnetic field of the earth and the platform (24) will not pendulate properly. So, the power supply is quite limited.

2. The strips (26) are approximately 0.001 inch, which is too thin and weak, easily broken and damaged.

3. The D.C. power source (34) should be stepped up to be 20 VAC, which is then stepped down to be 2–3 VDC for driving the diode (22), thereby wasting electric energy during the conversion from D.C. to A.C. and from A.C. to D.C., and shortening the service life of the power source of batteries.

4. Several heavy elements such as the step-up and step-down transformers and inverters, the damping magnets (32), and so on, will increase the total weight of the level instrument, causing leveling and handling inconvenience.

The present inventor has found the drawbacks of the prior art and invented the present automatic optical levelling, plumbing and verticality-determining apparatus.

SUMMARY OF THE INVENTION

The object of the present invention is to provide an automatic optical levelling, plumbing and verticality-determining appartus including: a base, a supporting and driving means adjustably standing on the base for supporting a frame having a plumb device secured to a horizontality calibrator universally pendulously mounted on the frame, a pair of plumb-line illuminators respectively secured on a top and a bottom portion of the plumb device for emitting an upper and a lower optical beam towards a ceiling and a ground floor for calibrating a vertical plumb line, a horizontal-line illuminator and a vertical-line illuminator symmetrically disposed on opposite ends of a T-shaped adapter mounted on a top of the plumb device and the horizontality calibrator for respectively emitting a horizontal optical line and a vertical optical line for determining or calibrating a horizontal plane and a vertical plane.

DETAILED DESCRIPTION

As shown in FIGS. 1–5, the present invention comprises: a base 1, a supporting and driving means 2 adjustably mounted on the base 1, a frame 3 rotatably mounted on the supporting and driving means 2, a plumb device 4 secured with a horizontality calibrator 5 universally pendulously mounted on the frame 3, an upper and lower plumb-line illuminators 6, 6a respectively secured on a top and a bottom of the plumb device 4, a horizontal-line illuminator 7 and a vertical-line illuminator 8 symmetrically disposed on opposite ends of a top portion of the horizontality calibrator 5 or on a top portion of the plumb device 4, and a transparent cover 9 encasing the illuminators 6, 7, 8 and the frame 3.

Each illuminator 6, 7, 8 may be a laser illuminator or laser diode for emitting laser beam outwardly through a lens or prism secured in front of the laser diode for producing a laser optical line or plane.

Figure 1:
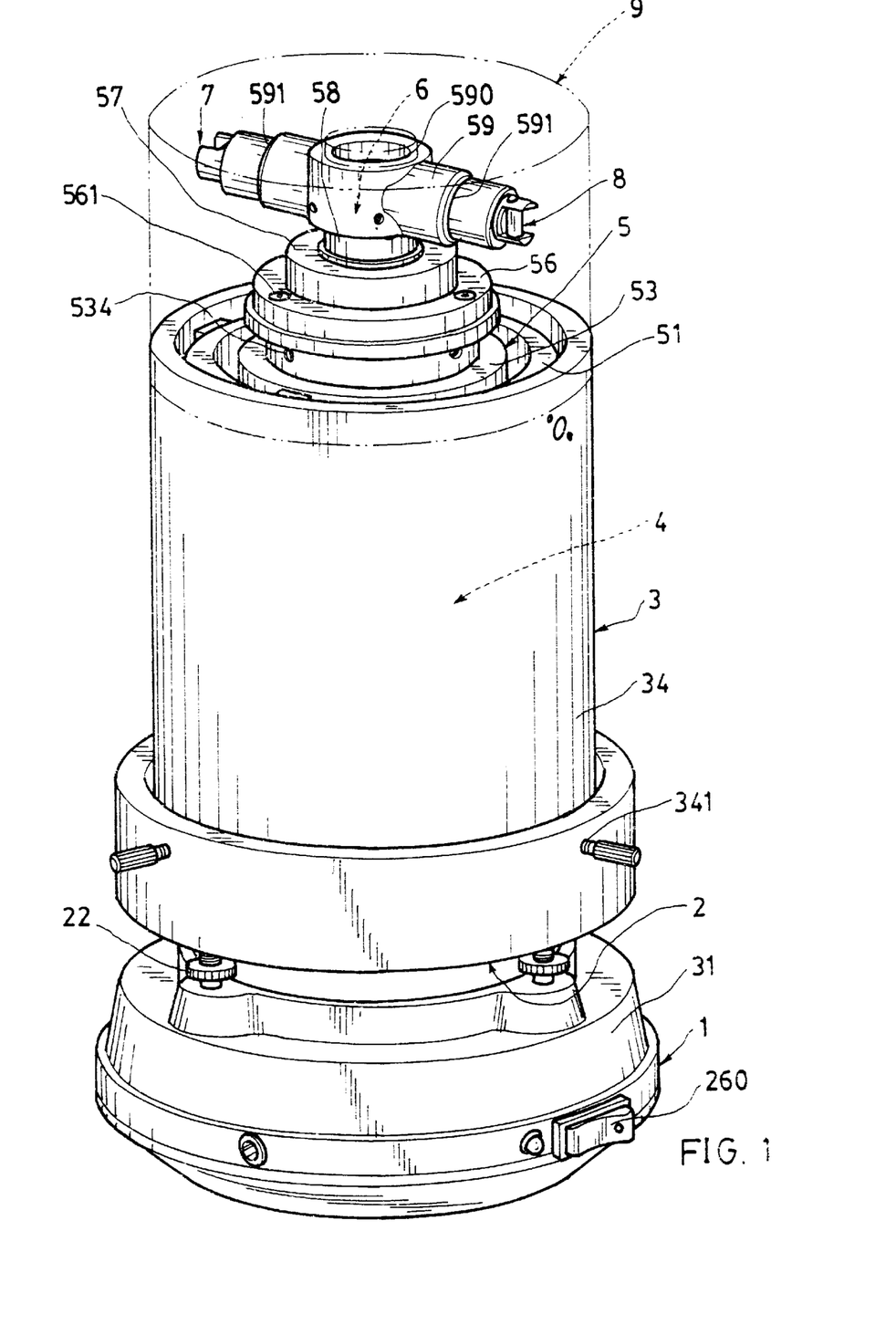
FIG. 1 is a perspective view of the present invention.
Figure 2:
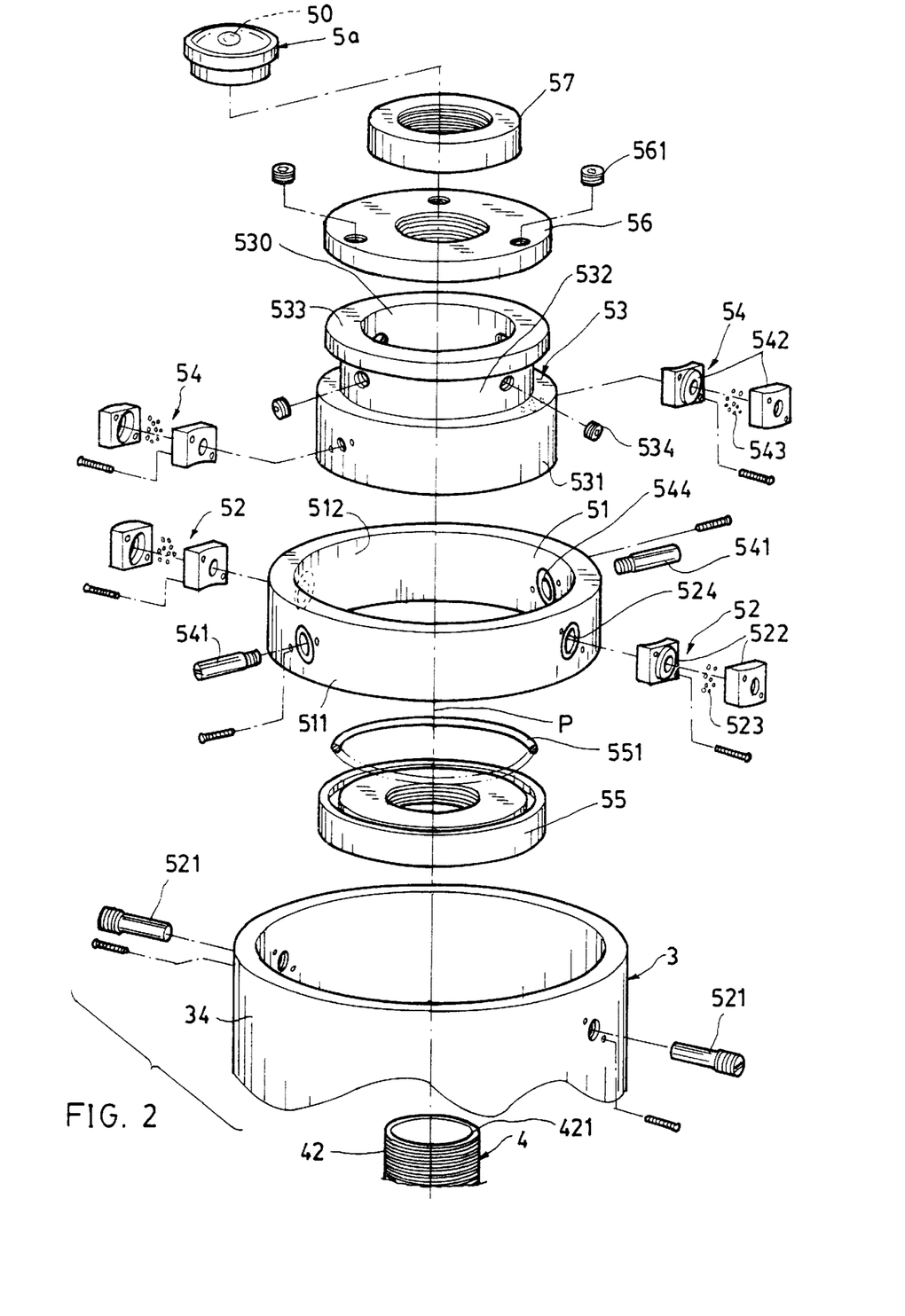
FIG. 2 is a partial exploded view of the elements of the present invention.
Figure 3:
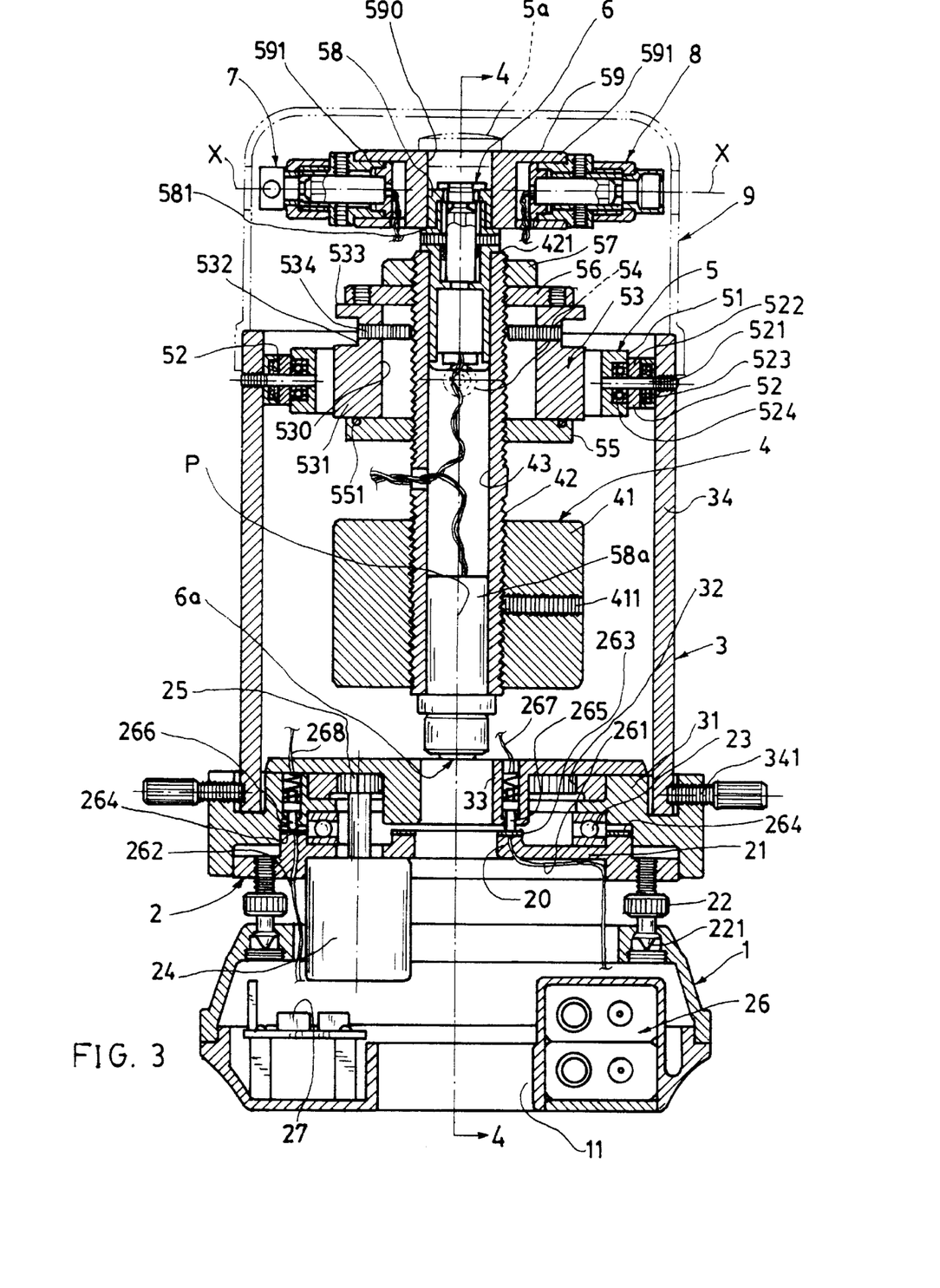
FIG. 3 is a longitudinal sectional drawing of the present invention.
Figure 4:
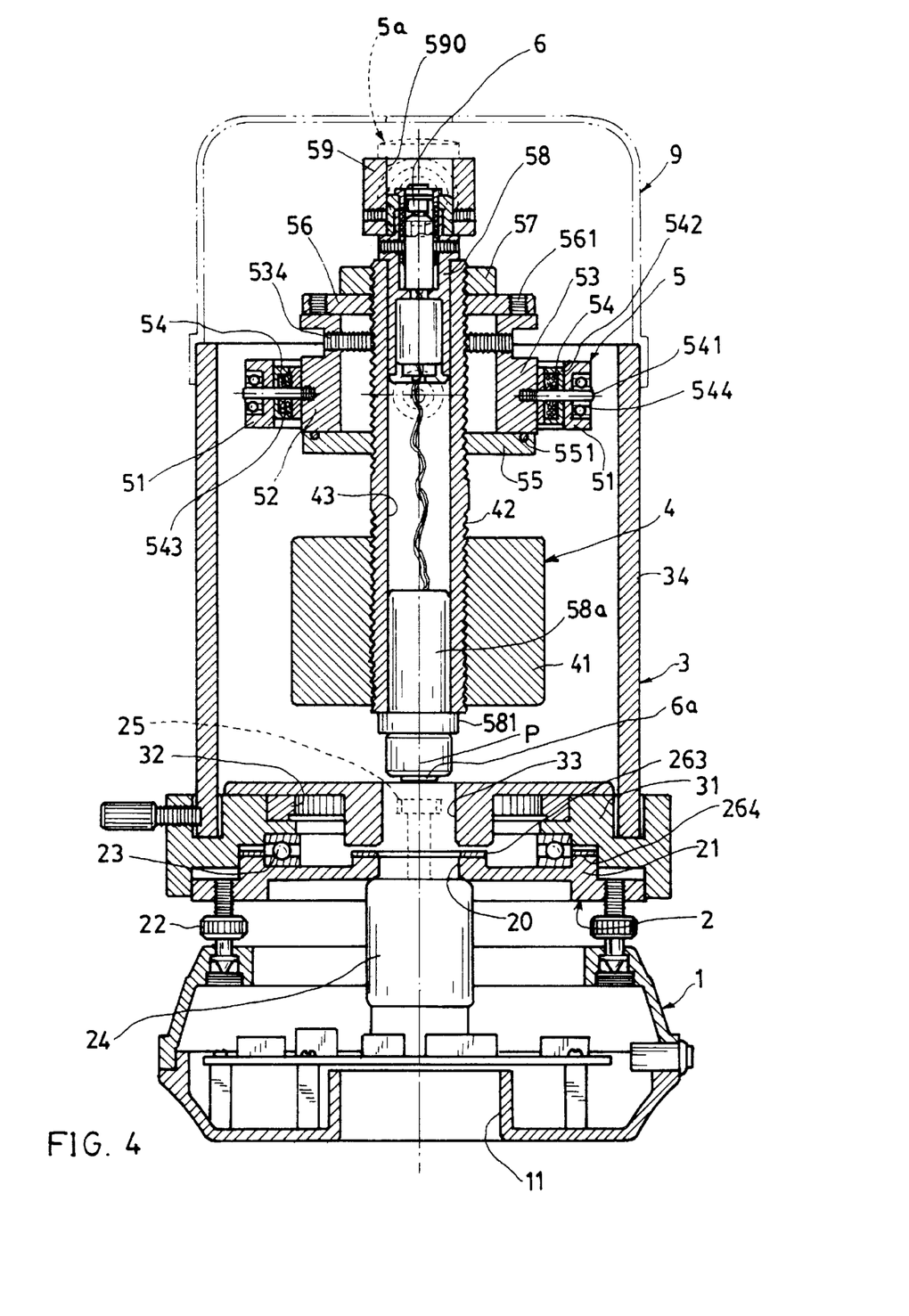
FIG. 4 shows another longitudinal sectional drawing of the present invention when viewed from 4—4 direction of FIG. 3.

The base 1 has a central hole 11 formed in a central portion of the base 1. The base 1 may also be formed with a chamber for storing batteries of a power source and for securing a control circuit or integrated circuit 27 within the base 1 as shown in FIG. 3. A switch 260 for switching on or off the power of the present invention may be formed on the base 1.

Figure 5:
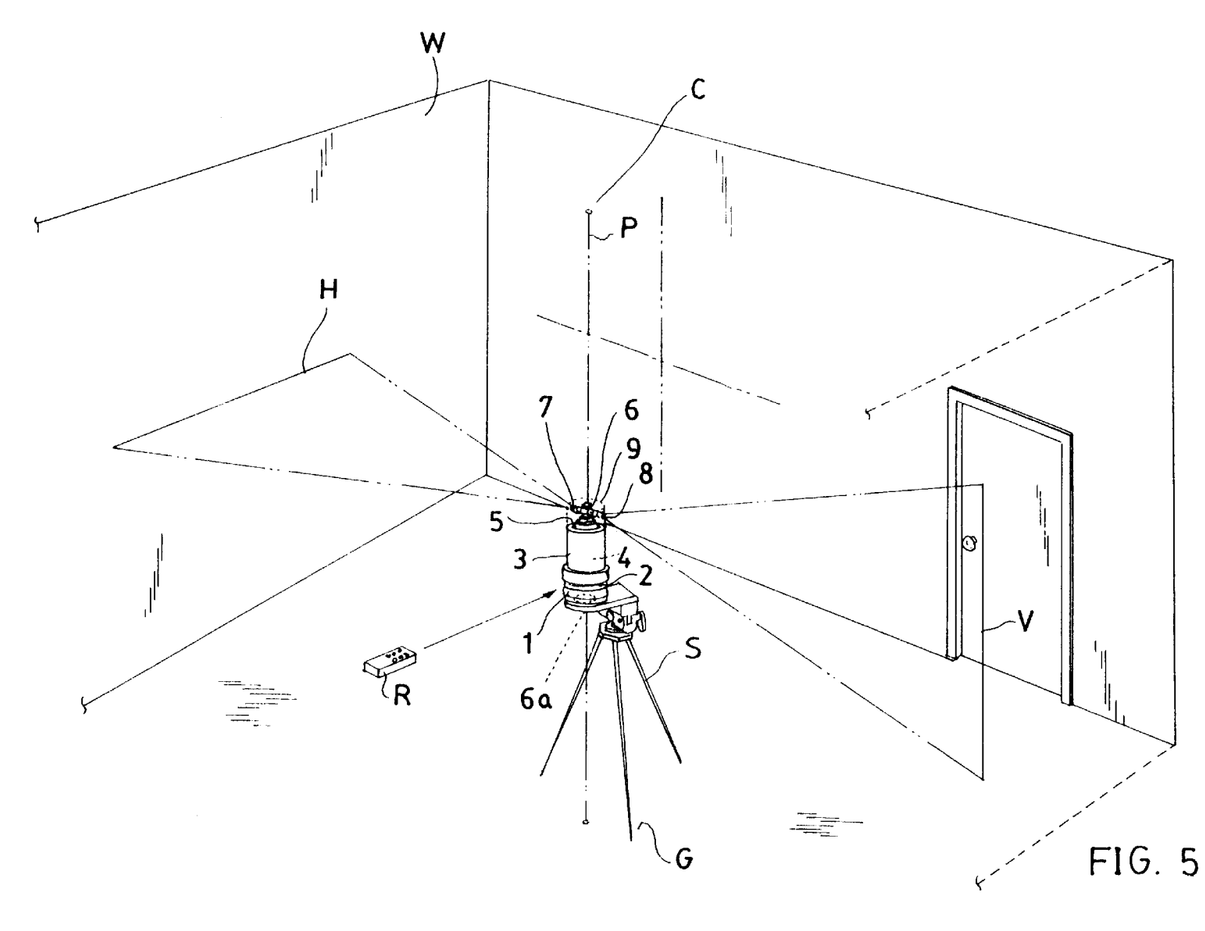
FIG. 5 is an illustration of the present invention used for optical calibration.

The supporting and driving means 2 includes: a supporting disk 21 rotatably secured with a plurality of adjusting screws 22 in the supporting disk 21 for adjustably mounting the supporting disk 21 on the base 1 (each screw 22 having a conical tip 221 standing on the base 1), a central hole 20 formed in a central portion of the supporting disk 21, a plurality of bearings 23 provided on the supporting disk 21 for rotatably mounting the frame 3 on the supporting disk 21, a driving motor 24 powered by a power source 26 and having a driving gear 26 secured on a driving shaft of the driving motor 25 for rotating the frame 3, with the power source 26 operatively switched on or off by a switch 260 or by a control circuit 27 and a remote controller R (FIG. 5).

The power source 26 may be batteries of direct current (D.C.) or may be an alternative current (A.C.) which is rectified and transformed, not limited in the present invention.

The base 1 may be mounted on a tripod or stand S as shown in FIG. 5.

The power source 26 includes: two input wires 261, 262 respectively connected to a positive and a negative pole of the power source; two annular conductive strips 263, 264 concentrically formed on the supporting disk 21 and electrically connected with the two input wires 261, 262; two conducting rods 265, 266 resiliently held in a bottom of the frame 3 to rotatably contact the two annular conductive strips 263, 264 formed on the supporting disk 21; and two output wires 267, 268 respectively connected to the two conducting rods 265, 266 for powering the illuminators 6, 6a, 7, 8.

The frame 3 includes: a bottom disk 31 rotatably mounted on the supporting disk 21 of the supporting and driving means 2 and having a follower gear 32 diametrically formed within the bottom disk 31 to be engageable with the driving gear 25 of the driving motor, a central hole 33 formed in a central portion of the bottom disk 31, and a cylindrical housing 34 protruding upwardly from the bottom disk 31 for pendulously mounting the horizontality calibrator 5 and the plumb device 4 on the cylindrical housing 34.

The plumb device 4 includes: a plumb weight 41 fixed on a pendulating stem 42 secured with and hung under the horizontality calibrator 5, with the pendulating stem 42 having a central through hole 43 longitudinally formed through the pendulating stem 42 and defining a plumb line P aligned with a longitudinal center of the central through hole 43 in the pendulating stem 42 and aligned with a gravity center of the plumb device 4, with a top surface 421 of the pendulating stem 42 being horizontal and perpendicular to the longitudinal center of the stem 42.

The horizontality calibrator 5 includes: an outer ring 51 pivotally mounted on an upper portion of the cylindrical housing 34 of the frame 3 by an outer damping pivoting means 52, an inner ring 53 pivotally secured with the outer ring 51 by an inner damping pivoting means 54, a lower nut 55 secured on the pendulating stem 42 and positioned below the inner ring 53 for retaining the inner rig 53 having an anti-slipping ring 551 packed between the inner ring 53 and the lower nut 55, a washer 56 locked on a top flange 533 of the inner ring 53 by screws 561, an upper nut 57 retaining the washer 56 and secured on an upper portion of the pendulating stem 42; and the upper plumb-line illuminator 6, the horizontal-line illuminator 7, and the vertical-line illuminator 8 mounted on a top portion of the pendulating stem 42.

The upper plumb-line illuminator 6 operatively emits an upward vertical optical beam or line and is mounted on a horizontal flange 581 of an upper cap member 58 which is cylindrically shaped and secured on a top portion of the pendulating stem 42 and inserted into the central through hole 43 in the pendulating stem 42, with the horizontal flange 581 being horizontal and projectively perpendicular to the plumb line P defined in the pendulating stem 42 when the upper cap member 58 is fixed on the stem 42, and the plumb-line illuminator 6 emitting an optical beam upwardly aligned with or parallel to the plumb line P towards a ceiling C as shown in FIG. 5 for calibrating a vertical line to be aligned with the plumb line.

The outer damping pivoting means 52 includes: a pivot 521 passing through the outer ring 51 and secured to the cylindrical housing 34 mounted on the bottom disk 31 of the frame 3 by screws 341; a damping box 522 filled with damping fluid and damping beads 523 in the damping box 522, and packed between the cylindrical housing 34 and the outer ring 51; and a bearing 524 secured in the outer ring 51 for rotatably mounting the pivot 521 therein for pivotally securing the outer ring 51 within the cylindrical housing 34 of the frame 3.

The inner damping pivoting means 54 includes: a pivot 541 passing through the outer ring 51 and secured to the inner ring 53; a damping box 524 filled with damping fluid and damping beads 543 in the damping box 542, and packed between the inner ring 53 and the outer ring 51; and a bearing 544 secured in the outer ring 51 for rotatably mounting the pivot 541 therein for pivotally securing the outer ring 51 with the inner ring 53.

The inner ring 53 includes: a central ring hole 530 formed therein, a lower cylindrical portion 531 pivotally connected with the outer ring 51; a cylindrical neck portion 532 protruding upwardly from the lower cylindrical portion 531 and projectively positioned above the outer ring 51, and adjustably secured to the pendulating stem 42 by a plurality of adjusting screws 534, an upper flange 533 being horizontal and projectively perpendicular to the plumb line P when the horizontality calibrator 5 is operatively adjusted by adjusting the screws 534 for slidably moving the inner ring 53 about the longitudinal center of the pendulating stem 42 until a gravity center of the plumb device 4 is aligned with the plumb line P of the plumb device 4 as checked by a bubble level 5a when detachably mounted on a top of the pendulating stem 42 when a bubble 50 located at a center of the level 5a and aligned with the plumb line P, whereby upon adjustment of the inner ring 53 about the longitudinal center of the pendulating stem 42, a gravity center of the plumb device 4 secured on the horizontality calibrator 5 is aligned with the plumb line P to obtain a real horizontality on the top surface 421 of the pendulating stem 42 and to obtain a horizontality on the top surface of the upper nut 57.

By the way, the upper plumb-line illuminator 6 will emit a vertical optical beam or line to be aligned with or parallel to the plumb line P for calibrating a vertical line with the plumb line P in an engineering construction or measuring.

The horizontal-line illuminator 7 and the vertical-line illuminator 8 are symmetrically mounted in a T-shaped adapter 59 which is mounted on a top portion of the pendulating stem 42 through the upper cap member 58; with the T-shaped adapter 59 having a pair of sleeves 591 symmetrically horizontally formed on opposite ends of the adapter 59 and defining a longitudinal axis X in a longitudinal center of each sleeve 591, and the longitudinal axis X projectively perpendicular to the plumb line P of the plumb device 4, and a central hole 590 vertically formed in a central portion of the adapter 59 for inserting the upper cap member 58 in the central hole 590 or for detachably inserting the bubble level 5a in the central hole 590 for calibrating a horizontality of the sleeves 591.

The horizontal-line illuminator 7 inserted in a first sleeve 591 of the adapter 59 emits a horizontal optical beam or line H projectively perpendicular to the plumb line P to be displayed on a wall W as shown in FIG. 5 for levelling purpose; and the vertical-line illuminator 8 inserted in a second sleeve 591 of the adapter 59 emits a vertical optical line V towards the wall W to be projectively parallel to the plumb line P for calibrating a verticality. The weight and momentum of the horizontal-line illuminator 7 is equal to that of the vertical-line illuminator 8 about a center of the adapter 59 for a gravitational balance on the pendulating stem 42.

Figure 6:
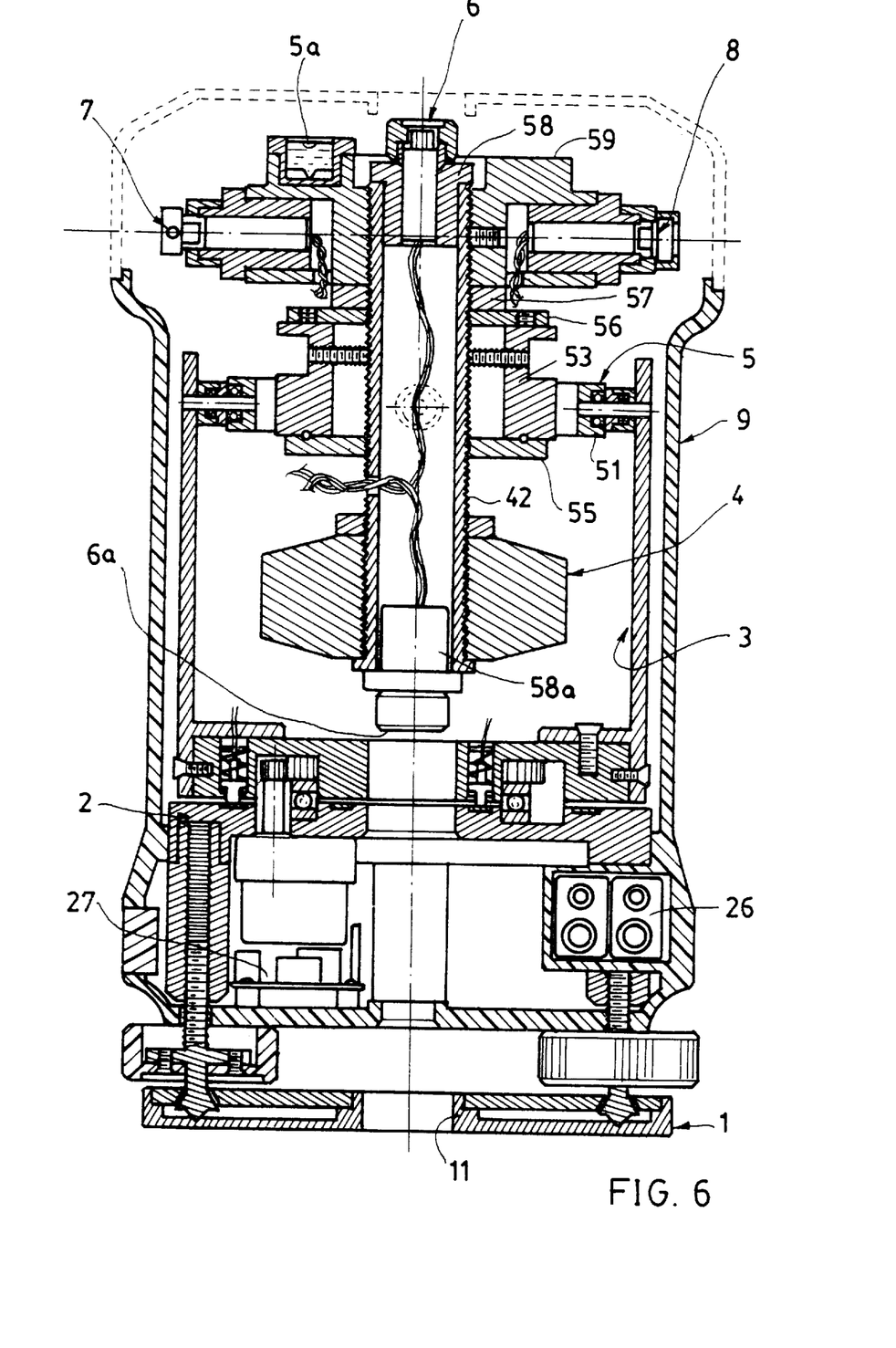
FIG. 6 shows another preferred embodiment of the present invention.

The horizontal-line illuminator 7 and the vertical-line illuminator 8 may be directly disposed on opposite sides of an upper end portion of the pendulating stem 42 as shown in FIG. 6 and positioned above the upper nut 57 of the horizontality calibrator 5.

The lower plumb-line illuminator 6a operatively emits a downward vertical optical beam or line and is mounted to a horizontal flange 581 of a lower cap member 58a which is cylindrically shaped and secured to a bottom portion of the pendulating stem 42 and inserted into the central through hole 43 in the pendulating stem 42, with the horizontal flange 581 being horizontal and projectively perpendicular to the plumb line P defined in the pendulating stem 42 when the lower cap member 58a is fixed on the stem 42, and the lower plumb-line illuminator 6a emitting an optical beam downwardly aligned with or parallel to the plumb line P towards a ground floor G as shown in FIG. 5 for calibrating a vertical line to be aligned with the plumb line.

As shown in FIG. 6, a transparent cover 9 is provided for completely covering the frame 3 and the several illuminators 6, 7, 8. The cover 9 may be detachably mounted on the base 1 or on the supporting and driving means 2. The batteries 26 and the control circuit 27 are then encased by the cover 9. The level 5a is directly mounted on the adapter 59.

Figure 7:
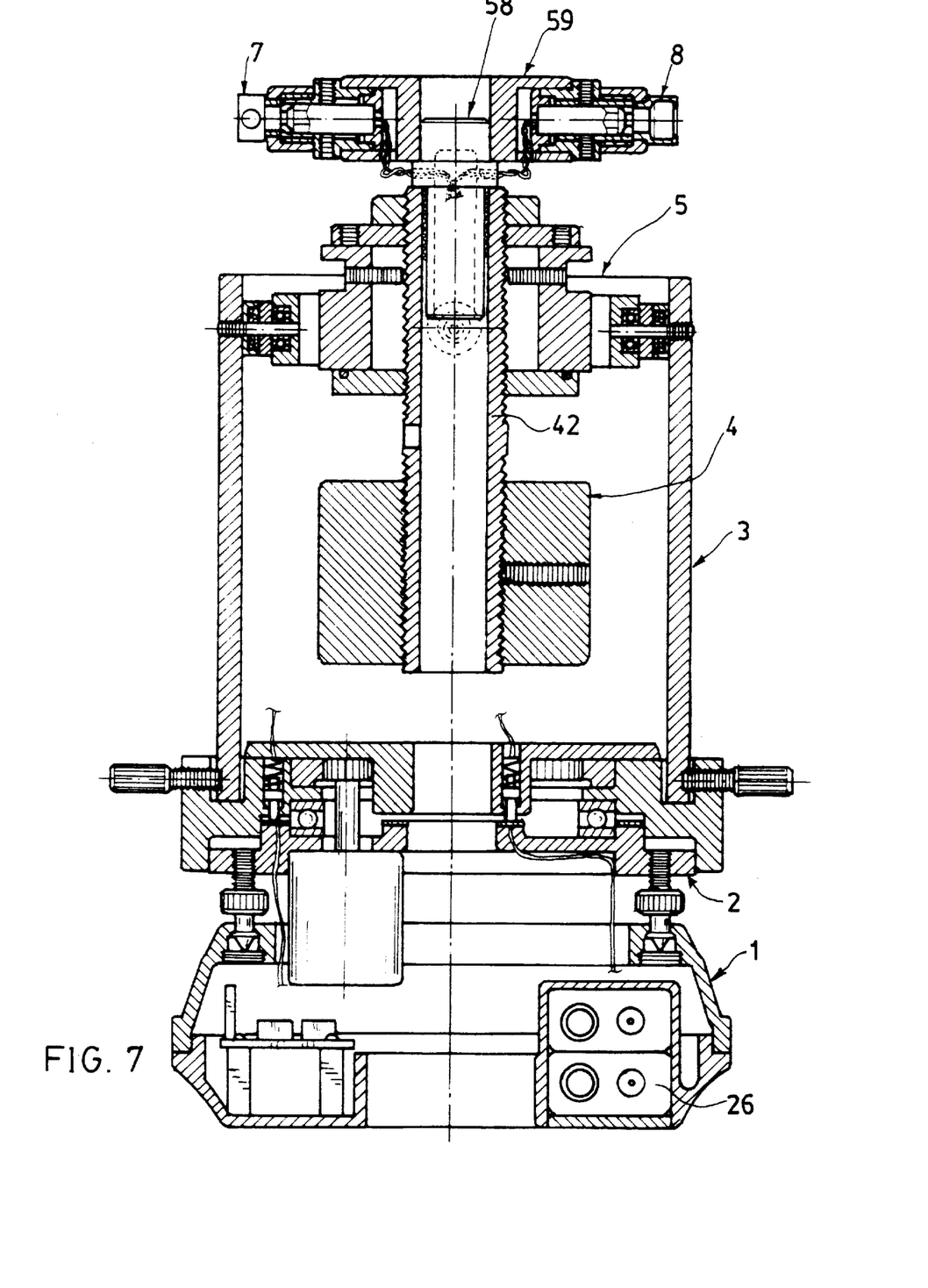
FIG. 7 shows still another preferred embodiment of the present invention.

In FIG. 7, the horizontal-line and vertical-line illuminators 7, 8 are directly mounted on the upper cap member 58 above the pendulating stem 42 by eliminating the plumb-line illuminators 6, 6a.

Figure 8:
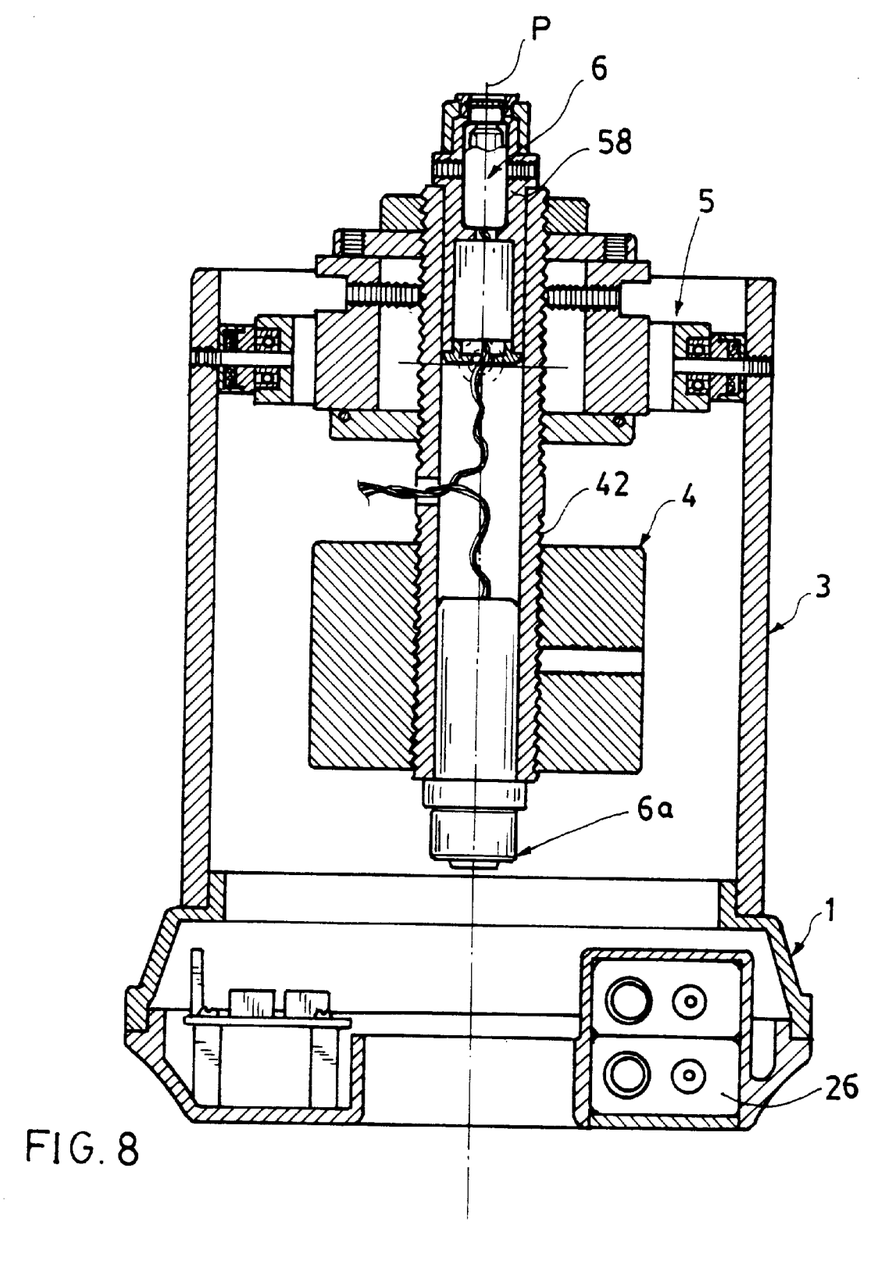
FIG. 8 shows further preferred embodiment of the present invention.

In FIG. 8, the present invention is simplified to remain the two plumb-line illuminators 6, 6a for calibrating a plumb line P only. Several elements have been omitted as shown in FIG. 8.

Figure 9:
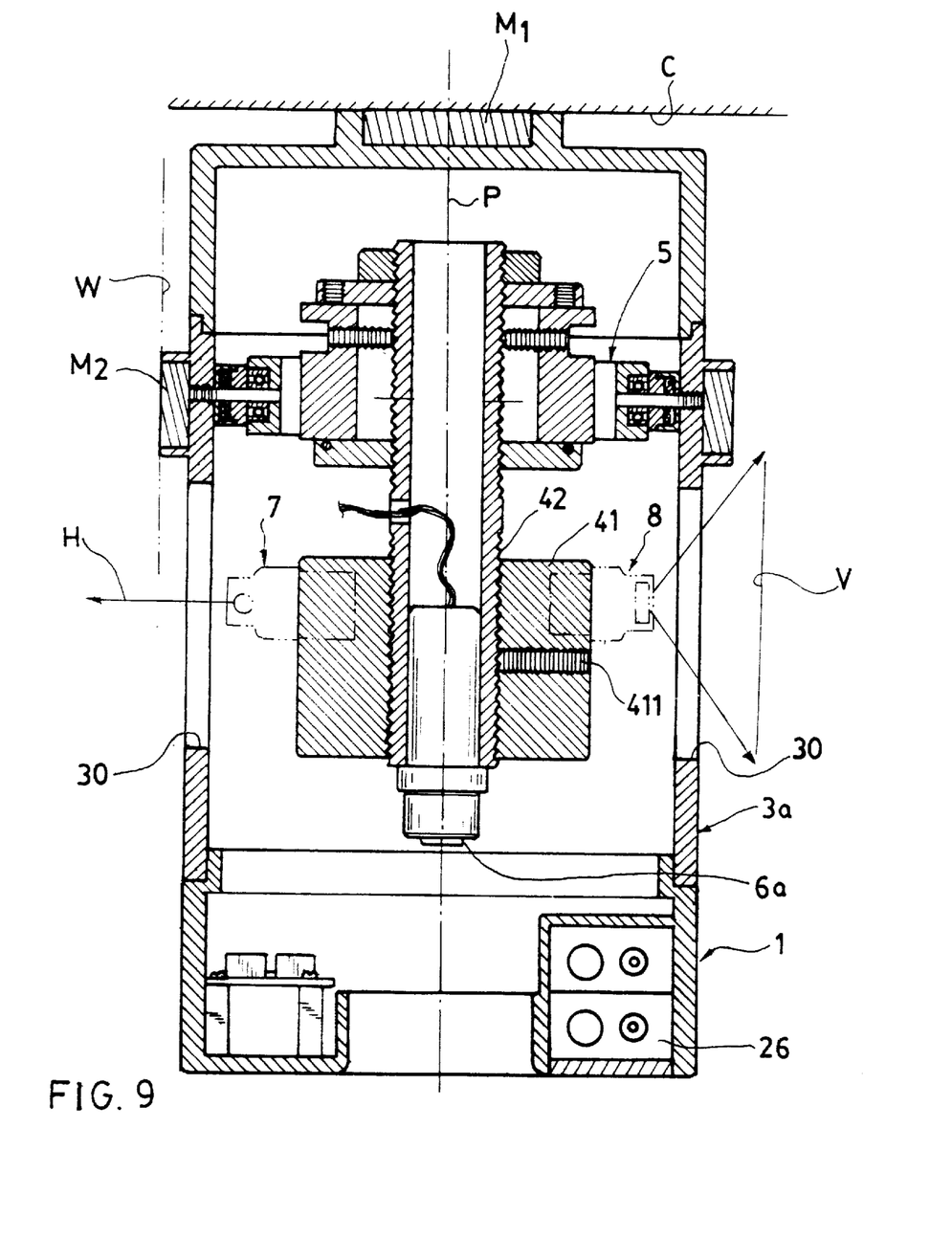
FIG. 9 shows still further preferred embodiment of the present invention.

As shown in FIG. 9, the horizontal-line and vertical-line illuminators 7, 8 are mounted in the plumb weight 41 which is secured to the stem 42 by screws 411; while a lower plumb-line illuminator 6a secured at a bottom of the stem 42. The optical lines H, V emitted from the two illuminators 7, 8 will pass through the slots 30 of the frame 3a.

The horizontal-line illuminator 7 may be singly mounted on the plumb weight 41 by aligning the gravity center of the plumb weight 41, as loaded with the horizontal-line illuminator 7, with the plumb line P. A top magnet M1 may be secured on a top of the frame 3a to be magnetically attracted to a ferrous ceiling C; and a side magnet M2 may be secured to a side portion of the frame 3a to be attracted on a ferrous wall W.

The plumb weight 41 may be mounted with prism or optical reflector (not shown) for reflecting a remote light as emitted from another levelling device for further calibration uses.

The present invention is superior to the prior art with amplified mechanism and structure. The horizontality calibrator is easily manipulated for adjusting and obtaining a datum horizontality or verticality, upon which the present invention may be served for levelling, plumbing and other calibrating uses. The batteries of direct current may be directly led to the luminators 6, 6a, 7, 8 without step-up and step-down transforming and rectifying operation as required by the prior art, therefore being more efficient and saving much energy than the prior art.

The present invention may be modified without departing from e spirit and scope of this invention.

We claim:

1. An automatic optical levelling, plumbing and verticality-determining apparatus comprising:

a base (1);

a supporting and driving means (2) adjustably mounted on said base (1), said supporting and driving means (2) including: a supporting disk (21) rotatably secured with a plurality of adjusting screws (22) in the supporting disk (21) for adjustably mounting the supporting disk (21) on the base (1), a central hole (20) formed in a central portion of the supporting disk (21), a plurality of bearings (23) provided on the supporting disk (21) for rotatably mounting a frame (3) on the supporting disk (21), a driving motor (24) powered by a power source (26) and having a driving gear (26) secured on a driving shaft of the driving motor (25) for rotating the frame (3);

said frame (3) rotatably mounted on and driven by said supporting and driving means (2), said frame (3) including: a bottom disk (31) rotatable mounted on the supporting disk (21) of the supporting and driving means (2) and having a follower gear (32) diametrically formed within the bottom disk (31) to be engageable with the driving gear (25) of the driving motor (24), a central hole (33) formed in a central portion of the bottom disk (31), and a cylindrical housing (34) protruding upwardly from the bottom disk (31) for pendulously mounting a horizontality calibrator (5) and a plumb device (4) on the cylindrical housing (34);

said plumb device (4) including: a plumb weight (41) fixed on a pendulating stem (42) secured with and hung under the horizontality calibrator (5) pivotally secured on the frame (3), with the pendulating stem (42) having a central through hole (43) longitudinally formed through the pendulating stem (42) and defining a plumb line P aligned with a longitudinal center of the central through hole (43) in the pendulating stem (42) and aligned with a gravity center of the plumb device (4), with a top surface (421) of the pendulating stem (42) being horizontal and perpendicular to the longitudinal center of the stem (42);

said horizontality calibrator (5) including: an outer ring (51) pivotally mounted on an upper portion of the cylindrical housing (34) of the frame (3) by an outer damping pivoting means (52), an inner ring (53) pivotally secured with the outer ring (51) by an inner damping pivoting means (54), a lower nut (55) secured on the pendulating stem (42) and positioned below the inner ring (53) for retaining the inner ring (53) having an anti-slipping ring (551) packed between the inner ring (53) and the lower nut (55), a washer (56) locked on a top flange (533) of the inner ring (53), an upper nut (57) retaining the washer (56) and secured on an upper portion of the pendulating stem (42): and upper plumb-line illuminator (6), a horizontal-line illuminator (7), and a vertical-line illuminator (8) mounted on a top portion of the pendulating stem (42);

the upper plumb-line illuminator (6) and a lower plumb-line illuminator (6a) respectively mounted on a top and a bottom of said plumb device (4) for emitting an upward optical beam and a downward optical beam, each said optical beam respectively aligned with or parallel to the plumb line (P) for optical plumbing;

the horizontal-line illuminator (7) and the vertical-line illuminator (8) symmetrically disposed on opposite sides of said plumb device (4) for respectively emitting a horizontal optical line for levelling and a vertical optical line for calibrating a verticality;

each of said illuminators (6,6a,7,8) being a laser diode for emitting a laser beam outwardly through a lens and a prism; and a transparent cover (9) encasing the illuminators (6,7,8) and said frame (3).

2. An automatic optical levelling, plumbing and verticality-determining apparatus according to claim 1, wherein said upper plumb-line illuminator (6) operatively emits an upward vertical optical beam and is mounted on a horizontal flange (581) adjacent an upper cap member (58) which is cylindrically shaped and secured on the top portion of the pendulating stem (42) and inserted into the central through hole (43) in the pendulating stem (42), with the horizontal flange (581) being horizontal and projectively perpendicular to the plumb line (P) defined in the pendulating stem (42) when the upper cap member (58) is fixed on the stem (42), and the upper plumb-line illuminator (6) emitting an optical beam upwardly aligned with or parallel to the plumb line (P) for calibrating a vertical line to be aligned with the plumb line; said pendulating stem (42) having the lower plumb-line illuminator (6a) secured thereto.

3. An automatic optical levelling, plumbing and verticality-determining apparatus according to claim 2, wherein said lower plumb-line illuminator (6a) operatively emits a downward vertical optical beam and is mounted to a horizontal flange (581) of a lower cap member (58a) which is cylindrically shaped and secured to a bottom portion of the pendulating stem (42) as inserted into the central through hole (43) in the pendulating stem (42), with the horizontal flange (581) being horizontal and projectively perpendicular to the plumb line (P) defined in the pendulating stem (42) when the lower cap member (58a) is fixed on the stem (42), and the lower plumb-line illuminator (6a) emitting an optical beam downwardly aligned with or parallel to the plumb line (P) for calibrating a vertical line to be aligned with the plumb line.

4. An automatic optical levelling, plumbing and verticality-determining apparatus according to claim 1, wherein said outer damping pivoting means (52) includes: a pivot (521) passing through the outer ring and secured to the cylindrical housing (34) mounted on the bottom disk (31) of the frame (3); a damping box (522) filled with damping fluid and damping beads (523) in the damping box (522), and packed between the cylindrical housing (34) and the outer ring (51); and a bearing (524) secured in the outer ring (51) for rotatably mounting the pivot (521) therein for pivotally securing the outer ring (51) within the cylindrical housing (34) of the frame (3).

5. An automatic optical levelling, plumbing and verticality-determining apparatus according to claim 1, wherein said inner damping pivoting means (54) includes: a pivot (541) passing through the outer ring and secured to the inner ring (53); a damping box (542) filled with damping fluid and damping beads (543) in the damping box (542), and packed between the inner ring (53) and the outer ring (51); and a bearing (544) secured in the outer ring (51) for rotatably mounting the pivot (541) therein for pivotally securing the outer ring (51) with the inner ring (53).

6. An automatic optical levelling, plumbing and verticality-determining apparatus according to claim 1, wherein said inner ring (53) includes: a central ring hole (530) formed therein, a lower cylindrical portion (531) pivotally connected with the outer ring (51); a cylindrical neck portion (532) protruding upwardly from the lower cylindrical portion (531) and projectively positioned above the outer ring (51), and adjustably secured to the pendulating stem (42) by a plurality of adjusting screws (534), an upper flange (533) being horizontal and projectively perpendicular to the plumb line (P) when the horizontality calibrator (5) is operatively adjusted by adjusting the screws (534) for slidably moving the inner ring (53) about the longitudinal center of the pendulating stem (42) until the gravity center of the plumb device (4) is aligned with the plumb line (P) of the plumb device (4) as checked by a bubble level when detachably mounted on a top of the pendulating stem (42).

7. An automatic optical levelling, plumbing and verticality-determining apparatus according to claim 1, wherein said horizontal-line illuminator (7) and the vertical-line illuminator (8) are symmetrically mounted in a T-shaped adapter (59) which is mounted on the top portion of the pendulating stem (42) through an upper cap member (58); with the T-shaped adapter (59) having a pair of sleeves (591) symmetrically horizontally formed on opposite ends of the adapter (59) and defining a longitudinal axis (X) in a longitudinal center of each said sleeve (591), and the longitudinal axis (X) projectively perpendicular to the plumb line (P) of the plumb device (4), and a central hole (590) vertically formed in a central portion of the adapter (59) for inserting the upper cap member (58) in the central hole (590) or for detachably inserting the bubble level (5a) in the central hole (590) for calibrating a horizontality of the sleeves (591).

8. An automatic optical levelling, plumbing and verticality-determining apparatus according to claim 7, wherein said horizontal-line illuminator (7) inserted in a first sleeve (591) of the adapter (59) emits a horizontal optical beam (H) projectively perpendicular to the plumb line (P) for levelling; and the vertical-line illuminator (8) inserted in a second sleeve (591) of the adapter (59) emitting the vertical optical line (V) to be projectively parallel to the plumb line (P) for calibrating a verticality; a weight and momentum of the horizontal-line illuminator (7) being equal to that of the vertical-line illuminator (8) about a center of the adapter (59) for a gravitational balance on the pendulating stem (42).

9. An automatic optical levelling, plumbing and verticality-determining apparatus according to claim 1, wherein said horizontal-line illuminator (7) and the vertical-line illuminator (8) are directly disposed on opposite sides of an upper end portion of the pendulating stem (42) and positioned above the upper nut (57) of the horizontality calibrator (5).

* * * * *